(12) United States Patent
Bata

(10) Patent No.: US 12,415,463 B1
(45) Date of Patent: Sep. 16, 2025

(54) CELLULAR PHONE MOUNT AND MAKEUP APPLICATION KIT FOR VEHICLES

(71) Applicant: Henrisch Bata, Burtonsville, MD (US)

(72) Inventor: Henrisch Bata, Burtonsville, MD (US)

( * ) Notice: Subject to any disclaimer, the term of this patent is extended or adjusted under 35 U.S.C. 154(b) by 422 days.

(21) Appl. No.: 18/102,213

(22) Filed: Jan. 27, 2023

(51) Int. Cl.
B60R 11/00 (2006.01)
B60R 11/02 (2006.01)

(52) U.S. Cl.
CPC ... B60R 11/0241 (2013.01); *B60R 2011/0294* (2013.01)

(58) Field of Classification Search
CPC .............. B60R 11/0241; B60R 2011/0294
See application file for complete search history.

(56) References Cited

U.S. PATENT DOCUMENTS

| | | | | |
|---|---|---|---|---|
| 5,329,947 A | * | 7/1994 | Shikler | A45C 11/008 132/304 |
| 2002/0135911 A1 | * | 9/2002 | Glasow | B60N 2/879 359/838 |
| 2011/0297714 A1 | | 12/2011 | Freeman | |
| 2021/0191063 A1 | * | 6/2021 | Schenker | F16M 11/046 |
| 2022/0128337 A1 | * | 4/2022 | Campbell | F41G 11/003 |
| 2022/0267205 A1 | * | 8/2022 | Chien | C03C 3/097 |

* cited by examiner

*Primary Examiner* — Ping Y Hsieh
(74) *Attorney, Agent, or Firm* — Sanchelima & Associates, P.A; Christian Sanchelima; Jesus Sanchelima

(57) ABSTRACT

A cellular phone mount and makeup application kit for vehicles including a base assembly, a makeup assembly, and a holder assembly. The base assembly includes a base with spring-loaded members that are compressed to be placed into the cup holder of a vehicle and a 12-volt lighter plug to provide power to a light and a plurality of lights embedded into a magnifying mirror of the makeup assembly. The makeup assembly further includes a telescopic arm with the magnifying mirror attached, thereby the user may adjust the magnifying mirror to a predetermined height where inside thereof the user may find a makeup kit. The holder assembly includes a phone holder attached to the base by means of a gooseneck, thereby the gooseneck provides a flexible element that is positioned in a predetermined orientation.

11 Claims, 4 Drawing Sheets

CELLULAR PHONE MOUNT AND MAKEUP APPLICATION KIT FOR VEHICLES

1. FIELD OF THE INVENTION

The present invention relates to a cellular phone mount and, more particularly, to a cellular phone mount and makeup application kit for vehicles that includes a base placed into the cup holder which includes a flexible phone holder and a telescopic arm for a makeup kit and mirror with a light source.

2. DESCRIPTION OF THE RELATED ART

Several designs for cellular phone mount and makeup application kit for vehicles have been designed in the past. None of them, however, include a base removably attachable to the cup holder of a vehicle which includes a telescopic arm with a magnifying mirror, wherein the magnifying mirror includes a light source powered by the power supply of the vehicle by means of a plug and a makeup kit, the base further includes a flexible phone holder.

Applicant believes that a related reference corresponds to U.S. Pat. No. 5,329,947 issued for a cosmetic bag for hanging on the sun visor of an automobile. Applicant believes that another related reference corresponds to U.S. patent No. 2011/0297714 issued for vehicle accessory holder. None of these references, however, teach of a cradle assembly that is mounted to the dashboard of a motor vehicle which is configured to support a cellular phone, a mirror with magnifying glass, a light source, and a makeup kit which are attached to the folding extension arm assembly.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a device that helps people to use their makeup kit comfortably in their vehicle.

It is another object of this invention to provide a device with a magnifying mirror and a makeup kit that is adjustable in height.

It is still another object of the present invention to provide a device with a phone holder to help people to use their phones comfortably without distraction while driving.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

Figure 1:
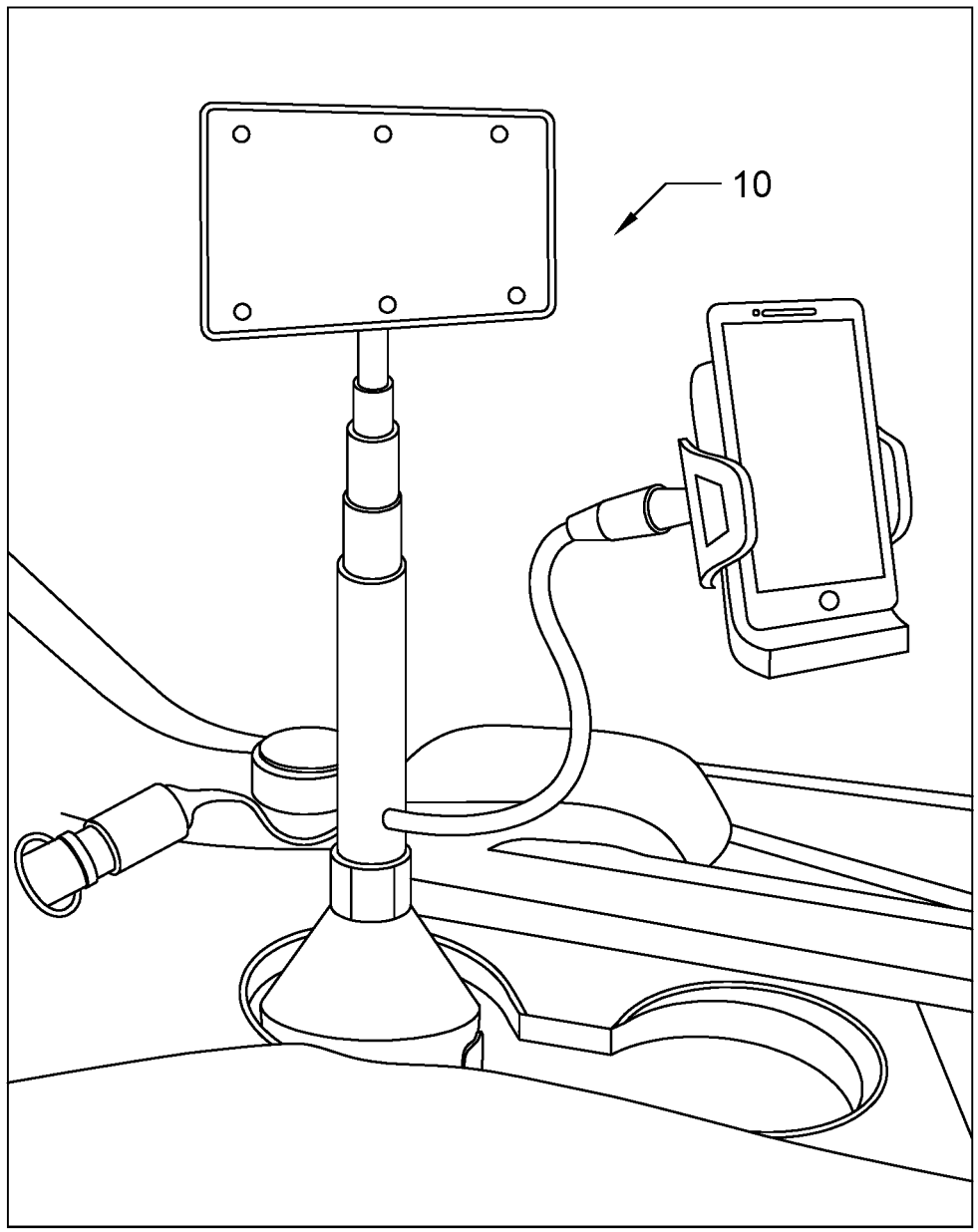

With the above and other related objects in view, the invention consists in the details of construction and combination of parts as will be more fully understood from the following description, when read in conjunction with the accompanying drawings in which:

FIG. 1 represents an operational view of an exemplary embodiment of the present invention 10.

Figure 2:
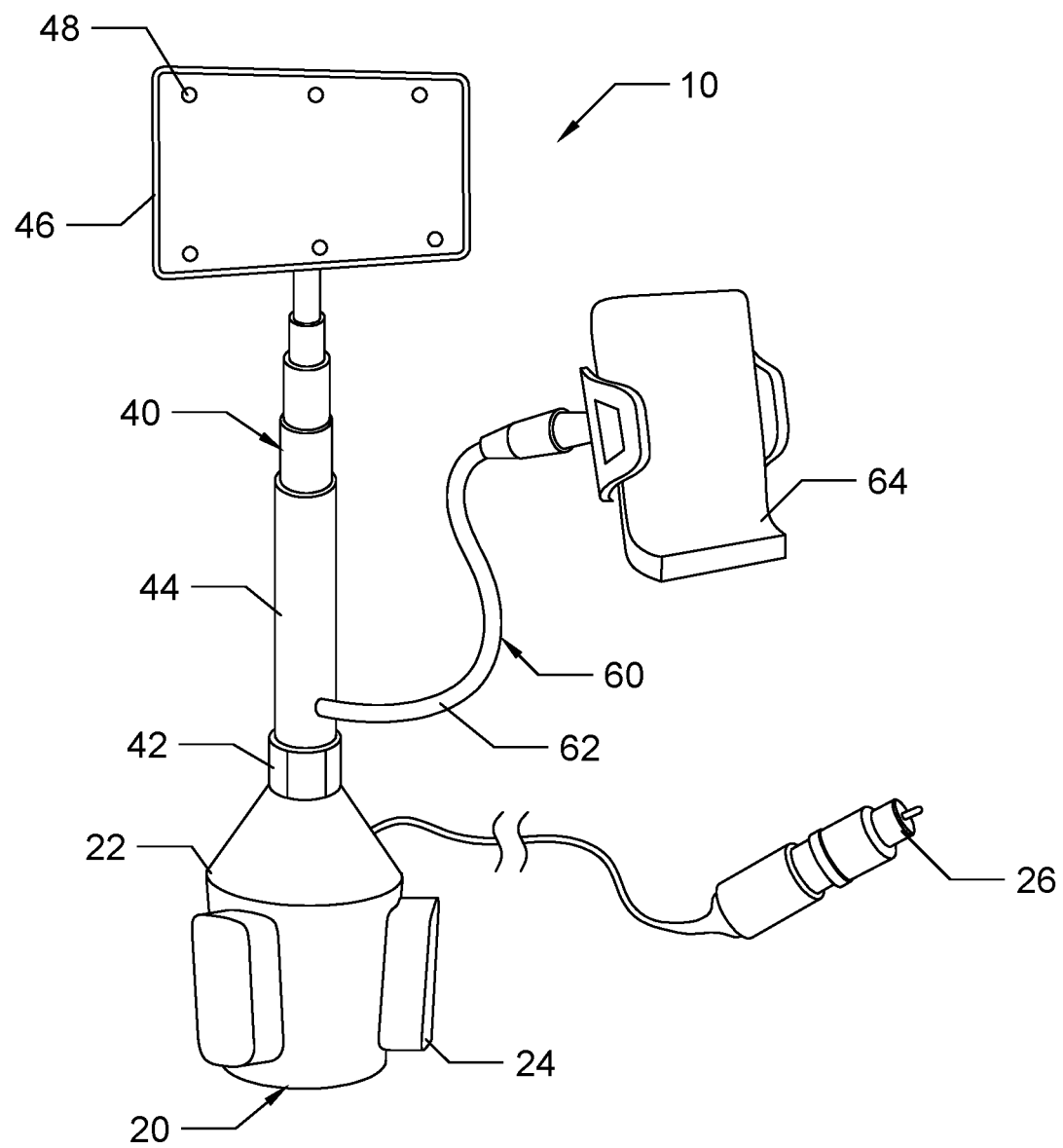

FIG. 2 shows an isometric view of the present invention 10, wherein the spring-loaded members 24 from the base 22 are deployed and the magnifying mirror 46 is coupled to the telescopic arm 44, thereby the magnifying mirror 46 is adjustable in height.

Figure 3:
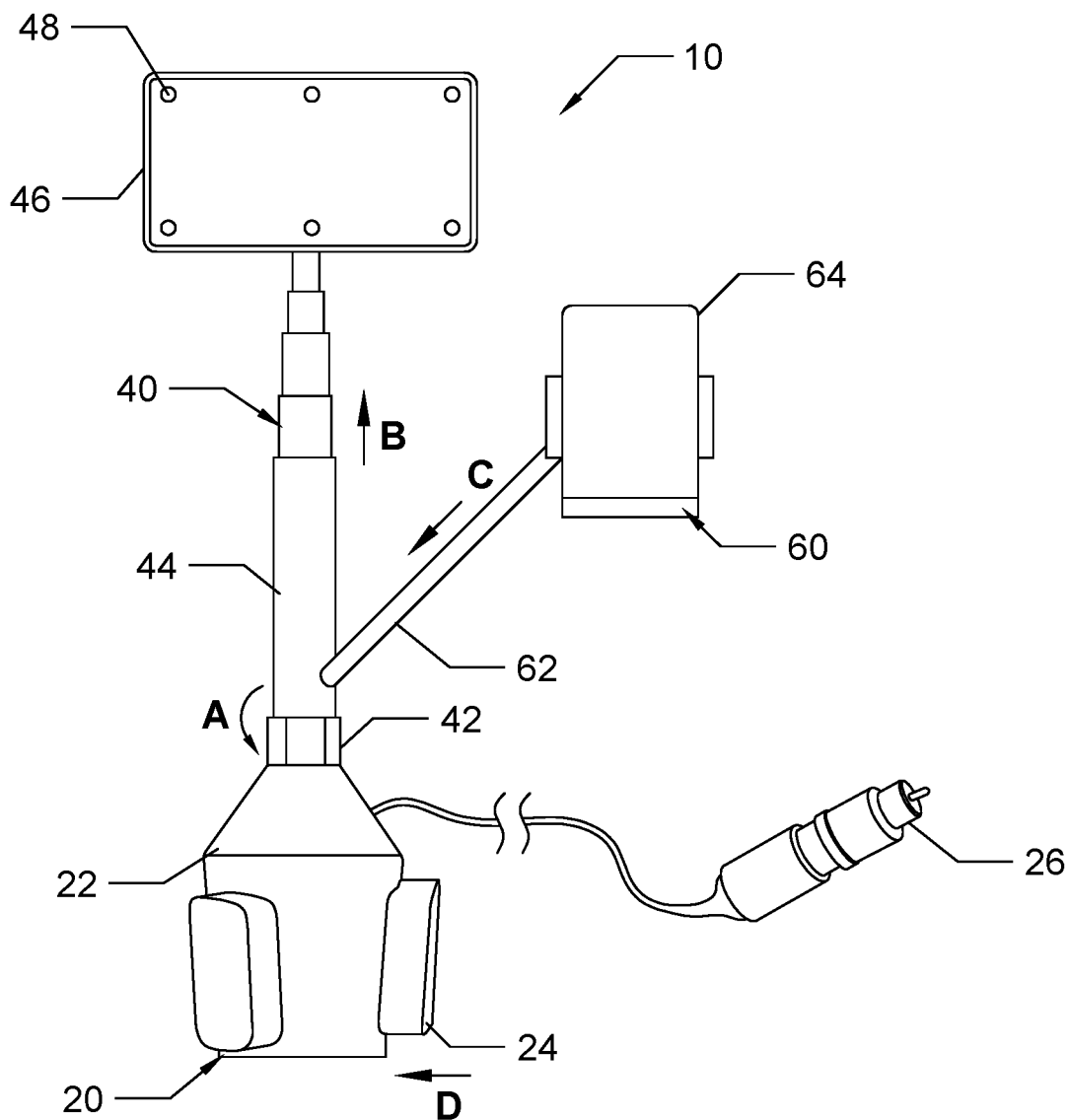

FIG. 3 illustrates a front view of the present invention 10, wherein the gooseneck 62 has a flexible body and the light 48 from the magnifying mirror 46 is powered by means of the lighter plug 26.

Figure 4:
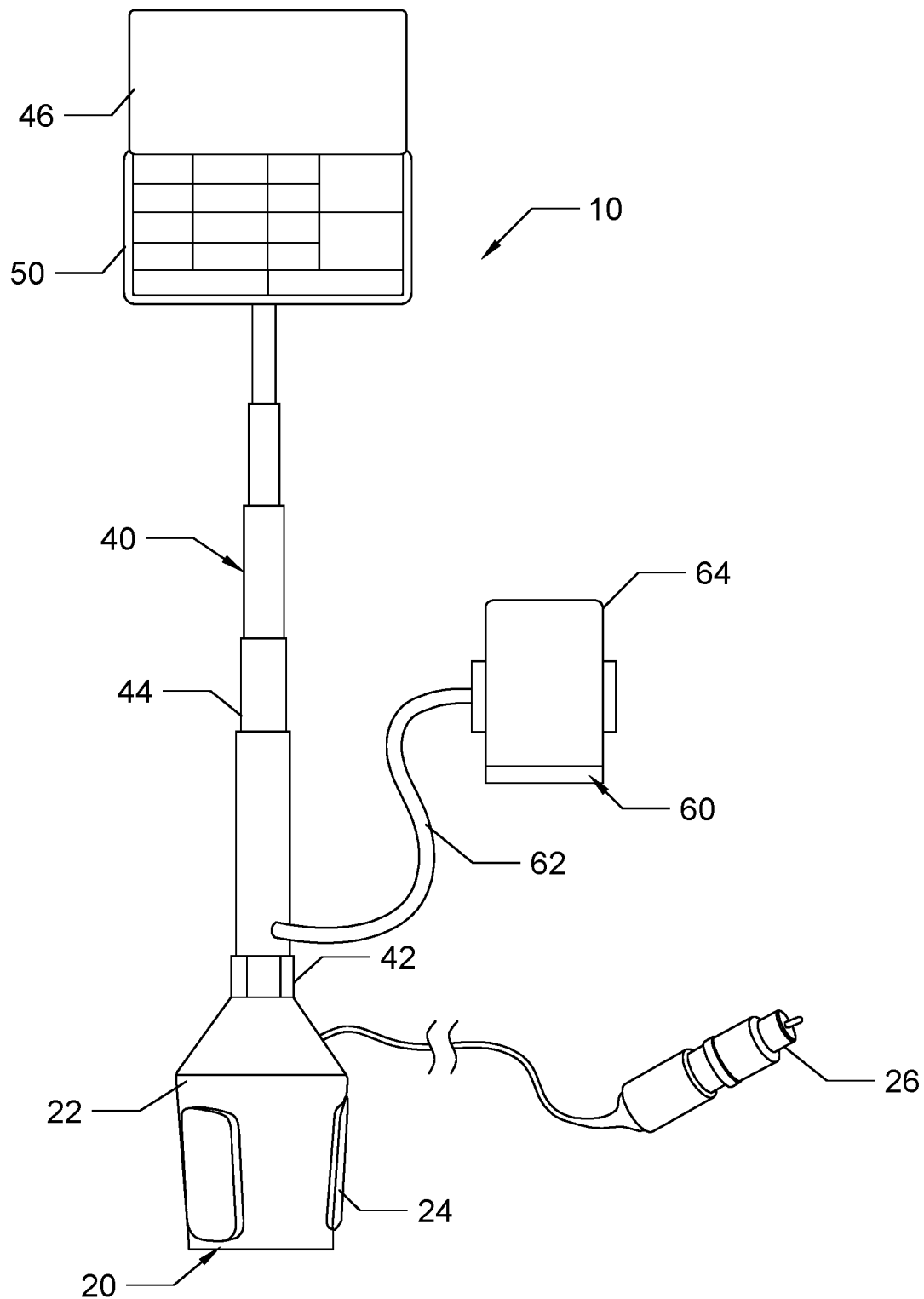

FIG. 4 is a representation of a front view of the present invention 10, wherein the telescopic arm 44 is in an extended configuration, the spring-loaded members 24 are in a undeployed configuration, the gooseneck 62 is folded, and the magnifying mirror 46 is in an opened configuration to access to the makeup kit 50.

V. DETAILED DESCRIPTION OF THE EMBODIMENTS OF THE INVENTION

Referring now to the drawings, where the present invention is generally referred to with numeral 10, it can be observed that it basically includes a base assembly 20, a makeup assembly 40, and a holder assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Base assembly 20 includes a base 22, spring-loaded members 24 and a lighter plug 26. In an exemplary embodiment, the base 22 may be a cylindrical-shaped support which sits into the receiving portion of a vehicle cup holder well known in the art. As FIG. 1 illustrates. In a suitable embodiment, the base 22 may include spring-loaded members 24 around the circumference thereof, wherein the mechanism that allows the spring-loaded members to be compressed, is housed into the base 22. The spring-loaded members are embedded in a portion around the cylindrical shape of the base 22, wherein the spring-loaded members 24 may have a cuboid shape or any other suitable shape that allows the spring-loaded members 24 to fit in the base 22. As FIG. 2 represents. It should be considered that the cuboid shape of the spring-loaded members 24 may have a fillet bottom edge that allows the spring-loaded members 24 to slide into the cup holder. In a preferred embodiment, the spring-loaded members when compressed are placed into the receiving portion or the cup holder, abutting against the walls thereof, providing support and preventing from pulling out of said cup holder. In other embodiment, the lighter plug 26 may be coupled to the base 22 by means to a wire operatively connected to a light 48, wherein the lighter plug 26 may be a 12 v plug that is plug in into the lighter socket of the vehicle, thereby providing a power supply to said light 48. As FIG. 1 depicts. The base 22 further includes a tapered top portion with a threaded opening where an adjustable nut 42 is coupled.

Makeup assembly 20 includes the adjustable nut 42, a telescopic arm 44, a magnifying mirror 46, the light 48, and a makeup kit 50. In an exemplary embodiment, the telescopic arm 44 may consist of a plurality of rods with decreasing diameters to place one rod inside another rod, allowing each rod of the plurality of rods to slide out from another. As the telescopic movement B described in FIGS. 3 and 4. In a preferred embodiment, a portion of the telescopic arm 44 may be coupled into the threaded opening of the base 22, wherein the bottom portion the telescopic arm 44 may include a flange, thereby the adjustable nut 42 which includes an internal flange on a top side thereof with a suitable opening where the telescopic arm passes through, thereby the telescopic arm 44 may have a rotational degree of freedom when the adjustable nut 42 is unthreaded with respect to the threaded opening of the base 22, allowing the telescopic arm 44 to rotate in a predetermined orientation as the user considers appropriate. The adjustable nut 42 when tight to the base 22 by means of the threaded section therebetween may secure the telescopic arm 44 by abutting the internal flange portion of the adjustable nut 42 and the flange of the telescopic arm 44 against the top portion of the opening of the base 22, thereby avoiding said rotational degree of freedom of the telescopic arm 44, providing a fixed position thereof. As the rotational motion A described in FIGS. 3 and 4 depicts. In one embodiment, the magnifying mirror 46 may be attached to the top rod of the telescopic arm 44, wherein the magnifying mirror 46 may be adjusted in height by means of the telescopic mechanism of the telescopic arm 44 and may be rotated in a predetermined position by means of the adjustable nut 42 as the user may consider appropriate. In a preferred embodiment, the magnifying mirror 46 may be a mirror that allows a user to zoom in on the user's face to give a greater visibility when making up or the like. The magnifying mirror 46 may have a rectangular shape, a circular shape or any other suitable shape where inside thereof may house a makeup kit. As FIG. 4 represents. The magnifying mirror 46 may include a hinge mechanism that allows it to be opened, wherein inside the magnifying mirror 46 the makeup kit 50 is placed. In one embodiment, the magnifying mirror 46 further includes a light 48 and/or a plurality thereof embedded into the magnifying mirror 46. As best depicted in FIG. 2. Nonetheless, it should be considered that the light 48 may be attached to the frame of the magnifying mirror 46 or any other suitable shape to light up the user's face. In a preferred embodiment, the light 48 may be powered by means of the lighter plug 26 connected to the lighter socket of the vehicle. It should be considered that the light 48 may be powered by means of a rechargeable battery housed into the base 22 or the magnifying mirror 46.

Holder assembly 6 includes a gooseneck 62 and a phone holder 64. In an exemplary embodiment, the gooseneck 62 may be a semi-rigid, flexible joining element attached to the telescopic arm 44 or the base 22, wherein the gooseneck 62 may be freely positionable as the user requires. As best illustrated in FIG. 2. In a suitable embodiment, the gooseneck may have attached at the distal end thereof the phone holder 64, wherein the phone holder 64 may have adjustable brackets on the lateral sides thereof and a base on a bottom portion thereof. The phone holder 64 may support a cellular phone well known in the art by means of the adjustable brackets and the base, wherein the adjustable brackets may be adjusted in length to receive a cellular phone in its various embodiments to be held in place. As FIG. 1 demonstrates.

The present invention 10 is intended to be portable, light in weight, and compact, where the user may extend the telescopic arm 44 until a predetermined height, thereby the user may use the magnifying mirror 46 and the makeup kit 50. In a suitable embodiment, the makeup kit 50 may include cosmetics well known in prior art. The telescopic arm 44 may prevent neck pain from using the rear mirror while the user is making up. In a preferred embodiment, the user may place the cellular phone on the phone holder 64 allowing the user to position the cellular phone in a predetermined orientation that prevents from distracting while driving.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A cellular phone mount and makeup application kit for vehicles comprising: a base assembly including a base, spring-loaded members and a lighter plug, wherein said base is a cylindrical-shaped support with a similar height as a cup holder of a vehicle, said base includes said spring-loaded members around a circumference thereof, said spring-loaded members have a cuboid shape, said lighter plug is coupled to said base by means of a wire, wherein said lighter plug is a 12 volt; a makeup assembly having an adjustable nut, a telescopic arm, a magnifying mirror, a light, and a makeup kit, wherein said adjustable nut is placed in a top portion of said base, said telescopic arm is a plurality of rods with decreasing diameters placed one inside another creating a telescopic mechanism, wherein said telescopic arm is placed on top of said base and passing through an opening of said adjustable nut, said magnifying mirror is attached to a rod of the telescopic arm, wherein said magnifying mirror includes said light on a front portion thereof and further includes said makeup kit therein; and a holder assembly including a gooseneck and a phone holder, wherein said gooseneck is a semi-rigid and flexible hose attached to said telescopic arm, wherein said gooseneck include at a distal end thereof said phone holder, wherein said phone holder is intended to receive and hold in place a cellular phone.

2. The cellular phone mount and makeup application kit for vehicles of claim 1, wherein said base has a tapered top portion with a threaded opening where said adjustable nut is coupled.

3. The cellular phone mount and makeup application kit for vehicles of claim 1, wherein said base has a hollow body, wherein a spring mechanism of said spring-loaded member is housed, thereby portion of said spring-loaded members protrudes from a circumference.

4. The cellular phone mount and makeup application kit for vehicles of claim 3, wherein said spring mechanism allows said spring-loaded members to be compressed and return to an original position when an applied force is no longer being exerted.

5. The cellular phone mount and makeup application kit for vehicles of claim 1, wherein said telescopic arm has a rotational degree of freedom, wherein said rotational degree of freedom is held in place by means of tightening said adjustable nut with respect to said threaded opening of said base.

6. The cellular phone mount and makeup application kit for vehicles of claim 1, wherein said light is embedded into a front side of said magnifying mirror, wherein said light includes a plurality thereof embedded along said magnifying mirror.

7. The cellular phone mount and makeup application kit for vehicles of claim 1, wherein said light is operatively connected to said lighter plug, thereby said light is powered by means of a power supply of said vehicle when said lighter plug is plugged in a lighter socket.

8. The cellular phone mount and makeup application kit for vehicles of claim 1, wherein said magnifying mirror has a hinge mechanism that allows it to be opened, wherein said makeup kit is housed inside said magnifying mirror, thereby said makeup kit is reachable by opening said magnifying mirror.

9. The cellular phone mount and makeup application kit for vehicles of claim 1, wherein said phone holder has adjustable brackets at the laterals thereof and a base on a bottom thereof, wherein said adjustable brackets allows said cellular phone to be held in place in its various embodiments thereof, wherein said base of said phone holder provides extra support.

10. A cellular phone mount and makeup application kit for vehicles comprising:
- a base assembly including a base, spring-loaded members and a lighter plug, wherein said base is a cylindrical-shaped support with a similar height as a cup holder of a vehicle, said base includes said spring-loaded members around a circumference thereof, said spring-loaded members have a cuboid shape, said lighter plug is coupled to said base by means of a wire, wherein said lighter plug is a 12 volt, wherein said base has a tapered top portion with a threaded opening where said adjustable nut is coupled, wherein said base has a hollow body, wherein a spring mechanism of said spring-loaded member is housed, thereby portion of said spring-loaded members protrudes from a circumference;
- a makeup assembly having an adjustable nut, a telescopic arm, a magnifying mirror, a light, and a makeup kit, wherein said adjustable nut is placed in a top portion of said base, said telescopic arm is a plurality of rods with decreasing diameters placed one inside another creating a telescopic mechanism, wherein said telescopic arm is placed on top of said base and passing through an opening of said adjustable nut, said magnifying mirror is attached to a rod of the telescopic arm, wherein said magnifying mirror includes said light on a front portion thereof and further includes said makeup kit therein, wherein said telescopic arm has a rotational degree of freedom, wherein said rotational degree of freedom is held in place by means of tighten said adjustable nut with respect to said threaded opening of said base, wherein said light is embedded into a front side of said magnifying mirror, wherein said light includes a plurality thereof embedded along said magnifying mirror; and
- a holder assembly including a gooseneck and a phone holder, wherein said gooseneck is a semi-rigid and flexible hose attached to said telescopic arm, wherein said gooseneck include at a distal end thereof said phone holder, wherein said phone holder is intended to receive and hold in place a cellular phone, wherein said phone holder has adjustable brackets at the laterals thereof and a base on a bottom thereof, wherein said adjustable brackets allows said cellular phone to be held in place in its various embodiments thereof, wherein said base of said phone holder provides extra support.

11. A cellular phone mount and makeup application kit for vehicles consisting of:
- a base assembly including a base, spring-loaded members and a lighter plug, wherein said base is a cylindrical-shaped support with a similar height as a cup holder of a vehicle, said base includes said spring-loaded members around a circumference thereof, said spring-loaded members have a cuboid shape, said lighter plug is coupled to said base by means of a wire, wherein said lighter plug is a 12 volt, wherein said base has a tapered top portion with a threaded opening where said adjustable nut is coupled, wherein said base has a hollow body, wherein a spring mechanism of said spring-loaded member is housed, thereby portion of said spring-loaded members protrudes from a circumference, wherein said spring mechanism allows said spring-loaded members to be compressed and return to an original position when an applied force is no longer being exerted;
- a makeup assembly having an adjustable nut, a telescopic arm, a magnifying mirror, a light, and a makeup kit, wherein said adjustable nut is placed in a top portion of said base, said telescopic arm is a plurality of rods with decreasing diameters placed one inside another creating a telescopic mechanism, wherein said telescopic arm is placed on top of said base and passing through an opening of said adjustable nut, said magnifying mirror is attached to a rod of the telescopic arm, wherein said magnifying mirror includes said light on a front portion thereof and further includes said makeup kit therein, wherein said telescopic arm has a rotational degree of freedom, wherein said rotational degree of freedom is held in place by means of tightening said adjustable nut with respect to said treaded opening of said base, wherein said light is embedded into a front side of said magnifying mirror, wherein said light includes a plurality thereof embedded along said magnifying mirror, wherein said light is operatively connected to said lighter plug, thereby said light is powered by means of a power supply of said vehicle when said lighter plug is plugged in a lighter socket, wherein said magnifying mirror has a hinge mechanism that allows to be opened, wherein said makeup kit is housed inside said magnifying mirror, thereby said makeup kit is reachable by opening said magnifying mirror; and
- a holder assembly including a gooseneck and a phone holder, wherein said gooseneck is a semi-rigid and flexible hose attached to said telescopic arm, wherein said gooseneck include at a distal end thereof said phone holder, wherein said phone holder is intended to receive and hold in place a cellular phone, wherein said phone holder has adjustable brackets at the laterals thereof and a base on a bottom thereof, wherein said adjustable brackets allows said cellular phone to be held in place in its various embodiments thereof, wherein said base of said phone holder provides support at a bottom side of said cellular phone.

* * * * *